United States Patent [19]
Watson

[11] 3,981,158
[45] Sept. 21, 1976

[54] DISCONNECT COUPLING FOR DRIVE SHAFTS

[75] Inventor: Kenneth Watson, Yeovil, England

[73] Assignee: Westland Aircraft Limited, Yeovil, England

[22] Filed: Jan. 6, 1975

[21] Appl. No.: 538,726

[30] Foreign Application Priority Data
Jan. 14, 1974   United Kingdom................ 1693/74

[52] U.S. Cl............................................ 64/6; 64/4; 64/9 R; 64/25; 74/15.2; 403/315; 192/114 T
[51] Int. Cl.².......................................... F16D 3/00
[58] Field of Search.................... 64/4, 13, 9, 25, 6, 64/23, 24; 74/15.2, 15.6; 403/315, 316; 123/90.17; 192/114 R

[56] References Cited
UNITED STATES PATENTS

| | | | |
|---|---|---|---|
| 1,853,359 | 4/1932 | Kaiser | 64/6 |
| 2,071,641 | 2/1937 | Lunn | 64/25 |
| 2,873,589 | 2/1959 | Crankshaw | 64/9 R |
| 3,062,025 | 11/1962 | Bastow et al. | 64/13 |
| 3,224,223 | 12/1965 | Wildhaber | 64/9 R |

*Primary Examiner*—Samuel Scott
*Assistant Examiner*—Randall Heald
*Attorney, Agent, or Firm*—Larson, Taylor and Hinds

[57] ABSTRACT

This invention relates to a disconnect coupling for drivingly connecting separate parts of a drive shaft, and finds particular application in helicopter tail rotor drive shafts. The coupling comprises components fixed respectively to the shaft parts and being separable in a generally axial direction to enable the drive shaft parts to be disconnected, and includes retaining means automatically operative to prevent axial separation of the separable components during rotation. In one embodiment a cylindrical drive member is coupled to one drive shaft part and includes adjacent one end a radially inwardly extending flange having a central aperture for co-operation with a retaining member secured on the other drive shaft part, the retaining member being arranged to protrude through the aperture when the coupling components are drivingly connected. Internal gear teeth are provided adjacent the other end of the drive member to mesh with external teeth on a gear rotationally fixed to the other drive shaft part to transmit torque between the drive member and the other drive shaft part when the components are drivingly connected. A plurality of flyweights are arranged in the retaining member so that at least part of each flyweight is automatically extended on rotation of the coupling so that movement of the retaining member through the aperture is prevented thereby to prevent separation of the coupling components during rotation.

13 Claims, 4 Drawing Figures

DISCONNECT COUPLING FOR DRIVE SHAFTS

This invention relates to a drive shaft disconnect coupling, and finds particular application in helicopter tail rotor drive shafts.

Single rotor helicopters employ, for yaw control, a tail rotor, which is usually supported at the aft end of a rearwardly extending tail cone. The tail rotor is driven from a main gearbox on the fuselage through a longitudinally extending drive shaft supported in steady bearings along the tail cone.

In helicopters designed for operation from the deck of a ship, it is often necessary to incorporate hinge means between the ends of the tail cone to enable folding of the tail rotor from its extended operational position to a stowed position adjacent the forward part of the tail cone to facilitate stowing the helicopter in the confined space available on board. This necessitates the incorporation of some form of disconnect coupling in the drive shaft. Such a coupling represents a potential weakness in the tail rotor power transmission system which is subject to vibrations and deflections, both of the drive shaft and of the tail cone, that must be accommodated by the drive shaft during operation and which must not result in damage to the coupling and accidental separation of the coupling during operation.

According to the invention I provide a drive shaft disconnect coupling for drivingly connecting separate parts of the drive shaft and having components separable in a generally axial direction to enable the drive shaft parts to be disconnected, the coupling including retaining means automatically operative to prevent axial separation of said separable components during rotation.

In preferred embodiments of the invention a flexible disc member is bolted to a cylindrical drive member and includes alternate bolt attachments for securing the disc member to one drive shaft part so as to allow angular displacement between the said one drive shaft part and the drive member.

The said drive member may have adjacent one end a radially inwardly extending flange with a central aperture for co-operation with a retaining member secured on the other drive shaft part, the said retaining member being arranged to protrude through the said aperture when the coupling components are drivingly connected, and preferably may have adjacent its other end internal gear teeth to mesh with external teeth on a gear rotationally fixed to the other drive shaft part to transmit torque between the drive member and the said other drive shaft part when the coupling components are drivingly connected. Alternatively, meshing splines, face dogs or crown teeth can be utilised to transmit torque between the parts.

The gear teeth on said drive member are preferably disposed wholly to one side of a coupling bending plane defined by said flexible disc member so as to ensure that the tooth mesh is not adversely affected by angular displacements permitted by the said flexible disc member.

The retaining member preferably houses a plurality of flyweights arranged to be retained in a retracted position within the member when the coupling is stationary to permit separation of the parts by movement of the retaining member through the aperture in the drive member flange, at least part of each flyweight being automatically extended on rotation of the coupling to a position such that the overall dimension of the extended parts is greater than the diameter of the said aperture, thereby to prevent movement of the retaining member through the flange aperture.

The retaining member is conveniently of truncated cone shape having a continuous circumferential slot formed in its largest diameter region, the flyweights being of generally arcuate shape pivotally mounted in said slot and having a mass section outboard of the pivot and radiussed to conform to the diameter of the retaining member when the flyweight is in the retracted position.

In one form of the invention, two arcuate shaped opposed flyweights are provided and each has an extension arm inboard of the pivot and provided with a radially inwardly extending spigot on which a spring is located to extend through an aperture in the retaining member to retain the flyweights in a retracted position when the coupling is stationary.

According to another aspect of the invention I provide, in a helicopter having a tail rotor located adjacent the end of a rearwardly extending tail cone comprising forward and rear sections joined through a generally vertical hinge located at one side thereof and a tail rotor drive shaft extending along the tail cone, a disconnect coupling located in the drive shaft so as to enable the rear section of the tail cone to be pivoted about the hinge, wherein the disconnect coupling comprises a flexible disc member connected through alternate bolted flange attachments to one drive shaft part and to a generally cylindrical drive member having at one end a radially inwardly extending flange with a central aperture and internal gear teeth adjacent its other end, said gear teeth being arranged to mesh with external gear teeth on a gear having internal axial splines in engagement with splines on a second drive shaft part, a retaining member secured at the end of said second drive shaft part for protrusion through the central aperture in the flange of the said drive member when the coupling is engaged, the retaining member housing a plurality of flyweights arranged to be retained in a retracted position within the member when the coupling is stationary to permit axial separation of the parts by movement of the retaining member through the said flange aperture, each flyweight being automatically extended during rotation of the coupling to a position in which such axial separation is prevented by abutment between the extended flyweights and the adjacent surface of the said flange.

Two embodiments of the invention will now be described by way of example only and with reference to the accompanying drawings, in which.

Figure 1:
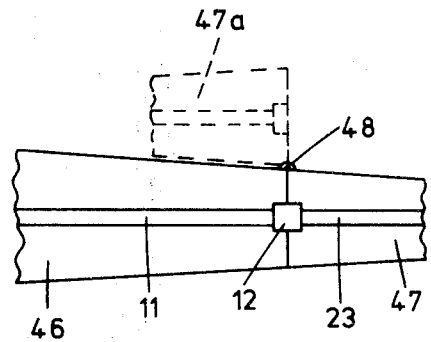
FIG. 1 is a plan view of part of a helicopter tail cone.

FIG. 1 diagrammatically illustrates part of a helicopter tail cone that includes a forward section 46 connected to a fuselage (not shown) and a rear section 47 arranged to support a tail rotor (not shown). The sections 46 and 47 are joined through a generally vertical hinge 48 located at one side thereof which permits pivotal movement of the rear section 47 to a folded position adjacent the side of the forward section 46 as shown at 47a in broken line in FIG. 1, thereby effectively reducing the length of the helicopter for storage purposes. Power for driving the tail rotor is transmitted from a main gearbox (not shown) through a divisible drive shaft comprising a shaft part 11, a disconnect coupling generally indicated at 12 and a shaft part 23. The coupling is so located in relation to the hinge 48 as to permit axial separation of the coupling components fixed respectively to the shaft parts 11 and 23 during pivotal movement of the rear section 47 of the tail cone about the hinge 48.

Figure 2:
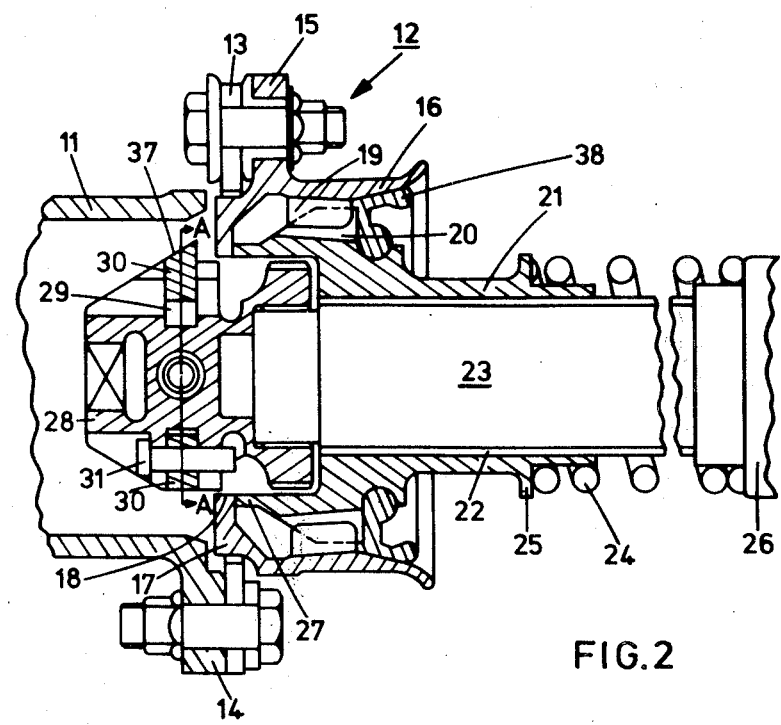
FIG. 2 is an axial section of one embodiment of a disconnect coupling according to the invention.
Figure 3:
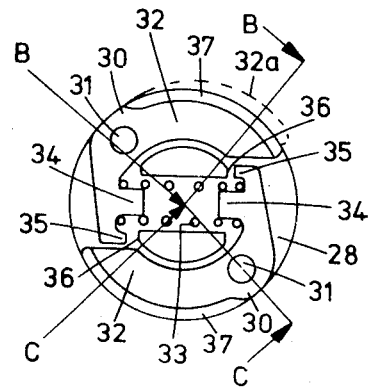
FIG. 3 is a section on line A—A of FIG. 2.

The disconnect coupling 12 shown in FIGS. 2 and 3 comprises a flexible laminated disc member 13 bolted alternately to flanges 14 formed on the aft end of the shaft part 11 and to flanges 15 formed on the exterior of a cylindrical drive member 16. A radially inwardly extending flange 17 having a central aperture 18 is formed adjacent a forward end of the member 16, and the aft end of the member 16 is flared. Internal gear teeth 19 are provided adjacent the aft end of the member 16, the teeth 19 meshing with external teeth 20 of a gear 21 which is located on longitudinally extending splines 22 at an end of the shaft part 23 to permit relative axial movement of the parts. A compression spring 24 is located between a flange 25 on the gear 21 and a fixed structure 26 to urge the gear 21 forwardly along the shaft part 23 to hold an annular protrusion 27 on a forward end of the gear 21 in contact with a surface of the flange 17, thereby to ensure that gear teeth 19 and 20 are retained in engagement when the coupling is stationary.

The gear teeth 19 and 20 are of generated involute tooth form cut to produce a varying thickness along the pitch line on both sides of each tooth so that the resultant lengthwise taper provides an engaging force component under both positive or negative torque transmission conditions yet allows unrestricted freedom for engagement and disengagement when stationary. The leading edges of teeth 20 are tapered rearwardly to aid re-engagement with teeth 19 when it is desired to reconnect the drive to the tail rotor.

A flexible seal 38 is located in a circumferential groove on the gear 21 to contact the surface of the flared end of the drive member 16.

A retaining member 28 is screwed on to the forward end of the shaft part 23 to protrude through the aperture 18 of the flange 17 and into the bore of the shaft part 11. The retaining member is of truncated cone shape and has a continuous circumferential slot 29 provided around its largest diameter region. Two flyweights 30 (FIGS. 2 and 3) of arcuate shape are located in the slot 29 and are pivotally mounted on pins 31 parallel with the longitudinal axis of the shaft part 23.

Before describing in detail the construction of the retaining member 28 it should be noted that the upper half of the sectioned view of the member 28 shown in FIG. 2 corresponds to a view taken on lines B—B of FIG. 3, whilst the lower half of the sectioned view of the member 28 shown in FIG. 2 corresponds to a view taken on lines C—C of FIG. 3.

The flyweights 30 each have a mass section 32 outboard of the pivot pin 31 and radiussed to conform to the diameter of the member 28, and an extension arm inboard of the pivot pin 31. Under static conditions, the mass sections 32 are urged into a retracted position within the member 28 by a spring 33 located in an aperture through the member 28 between diametrically opposed spigots 34 formed on the said extension arms of the flyweights 30. Movement of the mass sections 32 of the flyweights 30 outwardly from the slot 29 is possible by pivoting about the pins 31 to a position as shown in the upper half of the member 28 in FIG. 2 and by the dotted outline 32a in FIG. 3, this movement being limited by abutments 35 on the extension arms of the flyweights 30 contacting a surface 36 formed in the member 28 (FIG. 3).

A chamfer 37 is formed on the forward outer edge of the mass section 32 of each flyweight 30 so that, when the flyweight is in its extended position 32a, the chamfer provides a continuation of the conical surface of the member 28 as shown in the upper half of FIG. 2.

It will be clear from FIG. 2 that in their extended positions, the flyweights 30 provide a rib or flange having an effective diameter greater than the diameter of the aperture 18 in the flange 17, and also that the slot 29 is positioned so that adjacent surfaces of the flyweights 30 and the flange 17 are spaced apart axially by a predetermined amount under static conditions.

Figure 4:
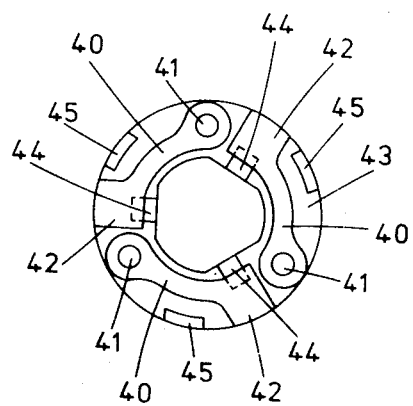
FIG. 4 is a view in section similar to FIG. 3, showing part of a second embodiment of the invention.

FIG. 4 shows a second embodiment that is characterised by a modified form of retaining member 43 in which three flyweights 40 are pivotally mounted on pins 41. The flyweights 40 each have a mass section 42 with a radiussed surface which, when the flyweights are retracted, conforms to the external diameter of the member 43, and permanent magnets 44 are fitted to retain the flyweights 40 in their retracted position under static conditions. Bosses 45 are provided on the member 43 to limit to a desired amount the extension of the flyweights 40 beyond the diameter of the member 43.

When the disconnect coupling 12 is in the engaged condition shown in FIG. 2, torque may be transmitted between the shaft part 11 and the shaft part 23 through the flanges 14, the flexible disc member 13 and the flanges 15 to the drive member 16 and thence through the meshing gear teeth 19 and 20 to the gear 21 and through the splines 22 to the shaft part 23. Centrifugal and intertial forces resulting from rotation of the coupling 12 cause extension of the mass sections 32 of the flyweights 30 to a position in which the sections 32 overlap the adjacent spaced surface of the flange 17 of the drive member 16.

The tooth form of the gear teeth 19 and 20 ensures that, during rotation of the coupling 12 under torque in either direction, an axial force is applied to the gear 21 tending to retain the annular protrusion 27 in contact with the surface of the flange 17, thereby ensuring that the gear teeth 19 and 20 are correctly meshed and cannot fly out of engagement.

In the static condition, the flyweights 30 are withdrawn to their retracted positions in the retaining member 28 and this, together with the shape of the member 28 and the tooth form of the gear teeth 19 and 20, means that unrestricted disengagement and engagement of the coupling 12 is assured by movement of the member 28 through the aperture 18. If, during re-engagement of the coupling 12, the teeth 20 do not mesh correctly with teeth 19, the output gear 21 will be moved axially along the splines 22 on the shaft part 23 against a force exerted by the spring 24. This arrangement prevents possible damage whilst permitting the re-engagement movement to be completed unhindered, and ensures that any subsequent rotary movement of the drive member 16 will result in automatic meshing of the gear teeth 19 and 20 under the influence of the spring 24.

The disconnect coupling 12 provides for transmission of power while giving limited freedom of motion between the shaft parts 11 and 23 to cater for deflections of the tail cone experienced during operation. Thus bending deflections are permitted by the flexible disc member 13 and the arrangement of both sets of gear teeth 19 and 20 on one side of the coupling bending plane defined by the flexible disc member 13 (on the output side on the embodiment shown) and the form of the teeth ensures that the coupling 12 is protected against damage by bending deflections permitted by the flexible disc member 13.

Axial movements within the coupling 12 are also permitted by the flexible disc member 13, such movements being caused by deflections of the tail cone which effectively change the length of the drive shaft. However, it will be apparent that axial movement causing a lengthening of the shaft will tend to separate the components of the coupling 12, and it is an important feature of the invention that such movement is permitted for a predetermined distance corresponding only to the spacing between the adjacent surfaces of the extended flyweights 30 and the flange 17 on the drive member 16. Axial movement beyond this distance is prevented by abutment of the adjacent surfaces to positively prevent separation of the components of the coupling 12 during rotation.

The present invention provides, therefore, a disconnect coupling for a helicopter tail rotor drive shaft which caters for deflections of the supporting tail cone during operation yet in which the possibility of damage caused by such deflections is effectively reduced. Separation of the coupling during rotation is not possible, yet unrestricted disengagement and engagement of the coupling is assured under static conditions to permit folding of the helicopter tail cone for storage purposes (FIG. 1).

In a disconnect coupling incorporating a retaining member 43 as illustrated in FIG. 4, operation is similar to that previously described except that the flyweights 40 are retained in a retracted position by the magnets 44 under static conditions, and that extension of the mass sections 42 during rotation is limited by abutment with the bosses 45.

Although the disconnect coupling has been described in relation to an installation in a helicopter tail rotor drive shaft, it will be understood that the invention will provide similar advantages in any drive shaft which has to be divisible when in a static condition, and which is subjected to vibrations and deflections during rotation.

I claim as my invention:

1. In a helicopter having a tail rotor located adjacent the end of a rearwardly extending tail cone comprising forward and rear sections joined through a generally vertical hinge located at one side thereof, and a tail rotor drive shaft extending along the tail cone, a disconnect coupling located in the drive shaft so as to enable the rear section of the tail cone to be pivoted about the hinge, wherein the disconnect coupling comprises a flexible disc member connected through alternate bolted flange attachments to one drive shaft part and to a generally cylindrical drive member having at one end a radially inwardly extending flange with a cental aperture and internal gear teeth adjacent to its other end, said gear teeth being arranged to mesh with external gear teeth on a gear having internal axial splines in engagement with splines on a second drive shaft part, a retaining member secured at the end of said second drive shaft part for protrusion through the central aperture in the flange of the said drive member when the coupling is engaged, the retaining member housing a plurality of flyweights arranged to be retained in a retracted position within the member when the coupling is stationary to permit axial separation of the parts by movement of the retaining member through the said flange aperture, each flyweight being automatically extended during rotation of the coupling to a position in which such axial separation is prevented by abutment between the extended flyweights and the adjacent surface of the said flange.

2. A drive shaft disconnect coupling for drivingly connecting separate parts of a drive shaft and being separable in a generally axial direction to enable the drive shaft parts to be disconnected, the coupling comprising in combination, a flexible disc member bolted to a cylindrical drive member and including alternate bolt attachments for securing the disc member to a first drive part, the drive member having a radially inwardly extending flange with a central aperture at an end adjacent the bolted attachment and internal gear teeth adjacent its other end, a gear having external gear teeth to mesh with the gear teeth in the drive member when the coupling is drivingly connected and being rotationally fixed to a second drive shaft part, a retaining member associated with the second drive shaft part and arranged to protrude through the aperture in the drive member when the coupling is connected, the retaining member including a plurality of flyweights arranged to be retained in a retracted position within the member when the coupling is stationary so as to permit axial separation of the parts by movement of the retaining member through the aperture, at least part of each flyweight being automatically extended on rotation of the coupling to a position such that an overall dimension of the extended parts is greater than the diameter of the aperture, thereby preventing separation of the drive shaft parts during rotation of the coupling.

3. A coupling as claimed in claim 2, wherein the gear has internal axial splines to mate with corresponding splines on the second drive shaft part to provide relative axial movement between the gear and the second shaft part, the retaining member being secured to an end of the second shaft part which protrudes through the gear.

4. A coupling as claimed in claim 2, wherein the retaining member is of truncated cone shape having a continuous circumferential slot formed in its largest diameter region, the flyweights being of generally arcuate shape pivotally mounted in said slot and each having a mass section outboard of the pivot and radiussed to conform to the diameter of the retaining member when the flyweight is in the retracted position.

5. A coupling as claimed in claim 4, wherein two opposed flyweights are provided and each said flyweight has an extension arm inboard of the pivot and provided with a radially inwardly extending spigot, an aperture through the retaining member housing a spring located on the opposed spigots so that the mass section of each flyweight is urged to its retracted position when the coupling is stationary.

6. A coupling as claimed in claim 4, wherein a permanent magnet is associated with each flyweight so as to retain the flyweight in its retracted position when the coupling is stationary.

7. A coupling as claimed in claim 4, wherein a chamfer is formed on the mass section of each flyweight so as to form an extension of the conical surface of the retaining member when the flyweight is in its extended position.

8. A coupling as claimed in claim 2, wherein the flyweights when extended are positioned at a predetermined axial spacing from the adjacent surface of the radially inwardly extending flange on said drive member.

9. A coupling as claimed in claim 2, wherein means are provided to prevent extension of the flyweights beyond a predetermined limit during rotation of the coupling.

10. A coupling as claimed in claim 3, wherein an annular protrusion is provided at the forward end of the gear for abutment against a surface of the radially inwardly extending flange on the drive member when the gear teeth are correctly meshed, and a spring is arranged to act on the gear to urge the protrusion into contact with the flange surface on the driving member.

11. A coupling as claimed in claim 2, wherein the gear teeth are of generated involute form of varying thickness along the pitch line on both sides of each tooth so that the tooth thickness tapers throughout its length.

12. A coupling as claimed in claim 2, wherein the leading edge of at least one of the sets of gear teeth is tapered rearwardly.

13. A coupling as claimed in claim 2, wherein said gear teeth on said drive member are disposed wholly to one side of a coupling bending plane defined by said flexible disc member.

* * * * *